(12) United States Patent
Liang

(10) Patent No.: US 6,247,220 B1
(45) Date of Patent: Jun. 19, 2001

(54) METHOD FOR FABRICATING A CASING HAVING TUBULAR SCREW POSTS

(75) Inventor: Andrew Liang, Tao-Yuan Hsien (TW)

(73) Assignee: Quanta Computer, Inc., Tao-Yuan Hsien (TW)

( * ) Notice: Subject to any disclaimer, the term of this patent is extended or adjusted under 35 U.S.C. 154(b) by 0 days.

(21) Appl. No.: 09/313,447

(22) Filed: May 18, 1999

(51) Int. Cl.[7] .............................. B23P 17/00; B29D 22/00
(52) U.S. Cl. .............................. 29/456; 29/423; 264/572; 425/130
(58) Field of Search .................................. 264/572, 238, 264/336, 513, 516; 425/130; 29/423, 456

(56) References Cited

U.S. PATENT DOCUMENTS 4,474,717 * 10/1984 Hendry ................................ 264/45.5
5,948,445 * 9/1999 Filipp ................................... 425/130

* cited by examiner

Primary Examiner—Leo B. Tentoni
Assistant Examiner—Suzanne E McDowell
(74) Attorney, Agent, or Firm—Renner, Otto, Boisselle & Sklar, LLP

(57) ABSTRACT

A method for fabricating a casing having tubular screw posts includes injection molding a resin composition in a mold to form the casing by introducing a pressurized gas into the resin composition through gas supplying pins to form hollow parts in the resin composition, providing the gas supplying pins with an outer diameter conforming to an inner diameter of the tubular screw posts, positioning the gas supplying pins in a mold at preset locations where the tubular posts must be formed, forming bores in the preset locations by removing the gas supplying pins from the preset locations before the resin composition is hardened, and providing internal screw members in the bores.

3 Claims, 2 Drawing Sheets

METHOD FOR FABRICATING A CASING HAVING TUBULAR SCREW POSTS

BACKGROUND OF THE INVENTION

1. Field of the Invention

The invention relates to a method for fabricating a casing, more particularly to a method for fabricating a casing having tubular screw posts that can simplify fabrication to enhance production efficiency.

2. Description of the Related Art

Gas-assisted injection molding methods have been widely used in fabricating casings, such as computer casings, in order to enhance strength and reduce sink marks. However, casings fabricated by a conventional gas-assisted injection molding method which employs gas supplying pins, are usually formed with extra projections at locations where the gas supplying pins are disposed. As these projections are undesirable and can interfere with assembly of components inside the casing, they must be cut out from the casing, thereby requiring additional finishing steps and increasing the production cost.

On the other hand, the process of cutting out the projections from the molded casing is generally done by a manual operation. It is necessary for workers to pay careful attention during the cutting operation in order to avoid excessive or deep cuts which will render the molded casing to become thin at the cut parts, or insufficient cuts which will leave uneven surfaces on the molded casing.

SUMMARY OF THE INVENTION

Therefore, the main object of the present invention is to provide a gas-assisted injection molding method for fabricating a casing having tubular screw posts which facilitates fabrication and reduces the manufacturing time thereof.

According to this invention, a method for fabricating a casing having tubular screw posts comprises injection molding a resin composition in a mold to form the casing by introducing a pressurized gas into the resin composition through gas supplying pins to form hollow parts in the resin composition, providing the gas supplying pins with an outer diameter conforming to an inner diameter of the tubular screw posts, positioning the gas supplying pins in a mold at preset locations where the tubular posts must be formed, forming bores in the preset locations by removing the gas supplying pins from the preset locations before the resin composition is hardened, and providing internal screw members in the bores.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
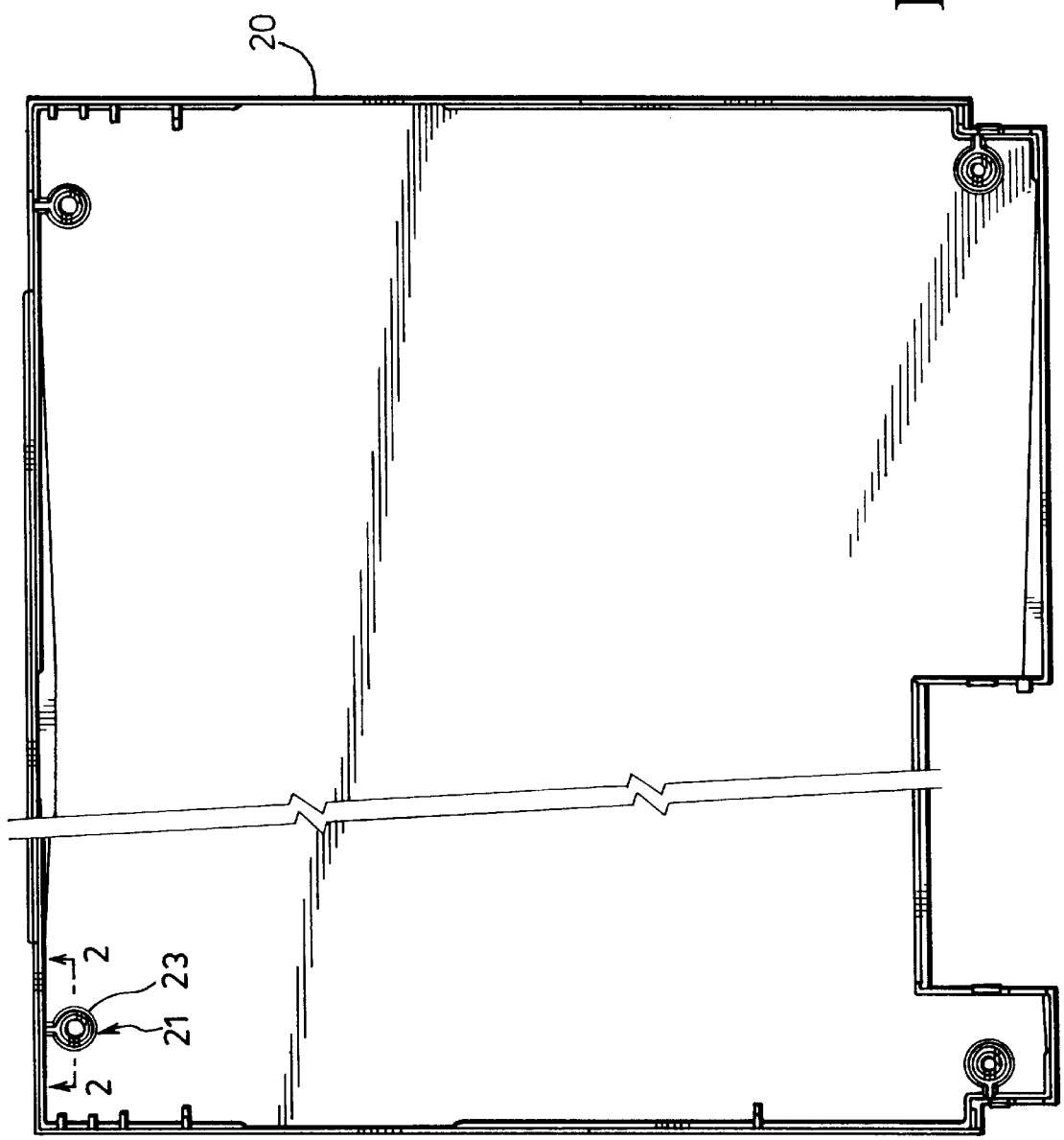
FIG. 1 is a schematic view of a casing made by the preferred embodiment of a method according to this invention.
Figure 2:
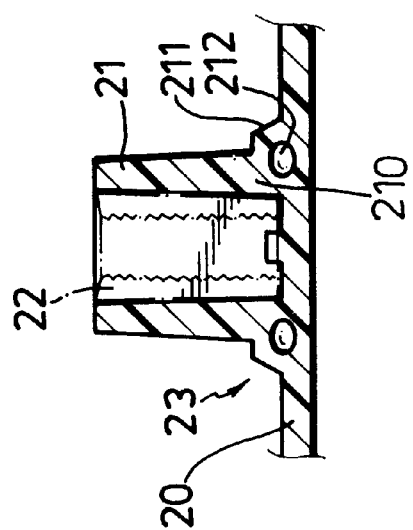
FIG. 2 is a sectional schematic view showing a tubular post of the casing in FIG. 1.

FIG. 1 shows a plastic casing 20 having four screw posts 21 which are employed to receive and engage fastening screws (not shown) that will be used to fasten the casing 20 to a related component. The casing 20 is an example that may be fabricated by a method embodying the present invention. As shown in FIG. 2, each screw post 21 is tubular and has a reinforcing hollowed rib 23. The hollowed rib 23 has a large thickness portion 211 extending around a foot 210 of each screw post 21, and a hollow 212 extending in the large thickness portion 211. A metal internal screw member 22 is disposed integrally inside each screw post 21.

In the preferred embodiment the plastic casing 20 is designed to hold a liquid crystal display, and the screw posts 21 are arranged at particular positions of the casing 20 according to a customized specification. The method according to the present invention is a gas-assisted injection molding method of the type which utilizes tubular gas supplying pins for introducing a gas into a resin composition fed into a mold. The fabrication of the casing 20 requires a mold which imparts the shape of the casing 20. The locations of the screw posts are preset in the mold according the customized specification.

Figure 3:
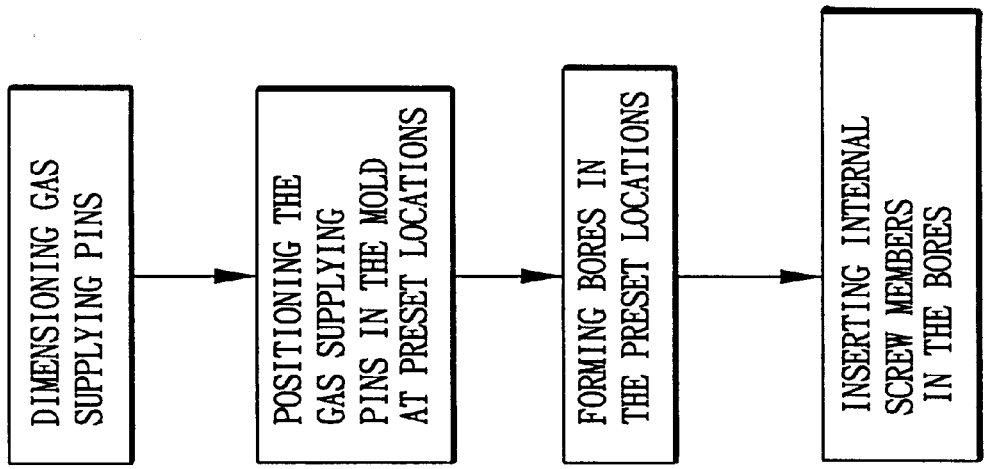
FIG. 3 is a flow chart illustrating the features of the method according to this invention for making the casing of FIG. 1.

Referring to FIG. 3, the features of the method of the present invention reside in the formation of screw posts from the bores left upon removal of the gas supplying pins. Firstly, the gas supplying pins are dimensioned in such a manner that an outer diameter of the gas supplying pins conforms to a predetermined inner diameter of the screw posts. Preferably, the number of the gas supplying pins used in the method is equal to that of the screw posts 21 formed in the casing.

During injection molding, the gas supplying pins are positioned in the mold at the preset locations of the screw posts. Feed entering channels and gas inlet channels are provided in the mold at appropriate locations which are determined depending on the locations of the gas supplying pins. The gas inlet channels are communicated with the gas supplying pins.

When a resin composition is fed into the mold through the feed entering channels, and when a pressurized gas is introduced into the resin composition through the gas inlet channels and the gas supplying pins, hollow parts are formed in the resin composition. In this embodiment, the mold is prepared in such a manner that it provides large thickness portions around the preset locations of the screw posts and that the pressurized gas is permitted to be blown into the large thickness portions to thereby from a reinforcing hollowed rib 23 around each screw post 21.

After completion of the introduction of the resin composition and the pressurized gas into the mold, the gas supplying pins are removed from the preset locations before the resin composition is hardened, thereby leaving bores at the preset locations of the screw posts 21. Finally, internal screw members 22 are inserted into the bores, respectively, before the resin composition is hardened so that the internal screw members 22 are connected integrally with the casing 20.

In the method of the present invention, as the screw posts 21 of the casing 20 are formed at the locations of the gas supplying pins, no extra finishing steps for cutting out projections resulting upon removal of the gas supplying pins are needed. In comparison with the conventional gas-assisted injection molding method for fabricating a casing, the present invention simplifies a method of injection molding a casing with screw posts, reduces the time required to fabricate the casing, and eliminates waste resulting from the use of the gas supplying pins.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A method for fabricating a casing having tubular screw posts, comprising injection molding a resin composition in a mold to form the casing by introducing a pressurized gas into the resin composition through gas supplying pins to form hollow parts in the resin composition, wherein the improvement comprises:

providing the gas supplying pins with an outer diameter conforming to an inner diameter of the tubular screw posts;

positioning the gas supplying pins in a mold at preset locations where the tubular posts must be formed;

forming bores in the preset locations by removing the gas supplying pins from the preset locations before the resin composition is hardened; and providing internal screw members in the bores.

2. The method as claimed in claim 1, further comprising providing a large thickness portion around each of the bores and introducing the pressurized gas into the large thickness resin portion during injection molding, thereby forming a reinforcing hollowed rib.

3. The method as claimed in claim 1, wherein the internal screw members are metal and are inserted into the corresponding bores before the resin composition is hardened.

* * * * *